United States Patent [19]
Harrell et al.

[11] Patent Number: 5,154,239
[45] Date of Patent: Oct. 13, 1992

[54] REVERSIBLE PLOW WITH SPRING-BIASED TRIP SHANKS

[75] Inventors: Danny H. Harrell, Camilla; Levy L. Harrell, Climax, both of Ga.

[73] Assignee: Harrell Equipment Company, Inc., Pelham, Ga.

[21] Appl. No.: 713,171

[22] Filed: Jun. 10, 1991

[51] Int. Cl.$^5$ .................. A01B 61/04; A01B 3/28
[52] U.S. Cl. .................................. 172/269; 74/2; 74/97.1; 403/2; 172/265; 172/219
[58] Field of Search ............ 172/261, 269, 270, 264, 172/266, 265, 267, 268, 683, 763, 233, 219, 705, 710; 403/2; 74/2, 97.1

[56] References Cited

U.S. PATENT DOCUMENTS

| | | | |
|---|---|---|---|
| 554,892 | 2/1896 | McFall | 172/265 |
| 2,328,449 | 8/1943 | Haberstump | 172/266 |
| 2,358,216 | 9/1944 | Den Besten | 172/261 |
| 2,775,183 | 12/1956 | Altgelt | 172/269 |
| 2,850,957 | 9/1958 | Silver | 172/269 |
| 3,223,176 | 12/1965 | Carra, Jr. et al. | 172/265 |
| 3,910,354 | 10/1975 | Johnson et al. | 172/711 |
| 4,116,280 | 9/1978 | Rehn et al. | 172/266 |
| 4,200,157 | 4/1980 | Anderson | 172/705 |
| 4,800,963 | 1/1989 | Gomez | 172/219 |
| 5,000,267 | 3/1991 | Harrell | 172/219 |

FOREIGN PATENT DOCUMENTS

| | | | |
|---|---|---|---|
| 4510/66 | 4/1967 | Australia | 172/265 |
| 1272613 | 4/1966 | Fed. Rep. of Germany | 172/269 |
| 2447921 | 4/1976 | Fed. Rep. of Germany | 172/265 |
| 1315399 | 2/1962 | France | 172/261 |

*Primary Examiner*—Dennis L. Taylor
*Assistant Examiner*—Spencer Warnick
*Attorney, Agent, or Firm*—Hopkins & Thomas

[57] ABSTRACT

A reversible plow having a plurality of spring-biased trip assemblies for mounting moldboards to a tool bar, the trip assemblies having angled, elongate slots and a pivot pin extending therethrough and adapted to allow a tripped assembly to be reset without compressing a compression spring.

9 Claims, 8 Drawing Sheets

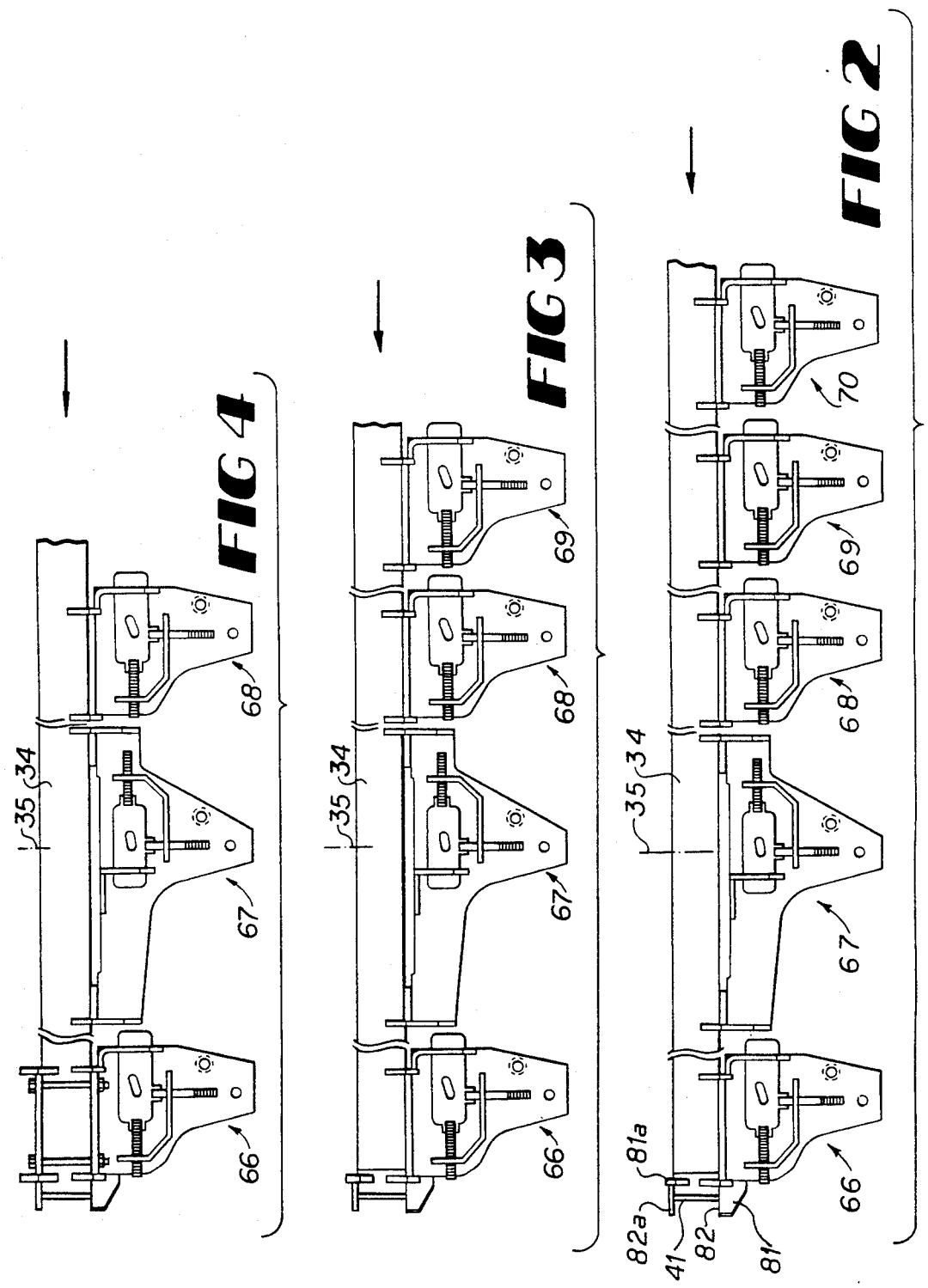

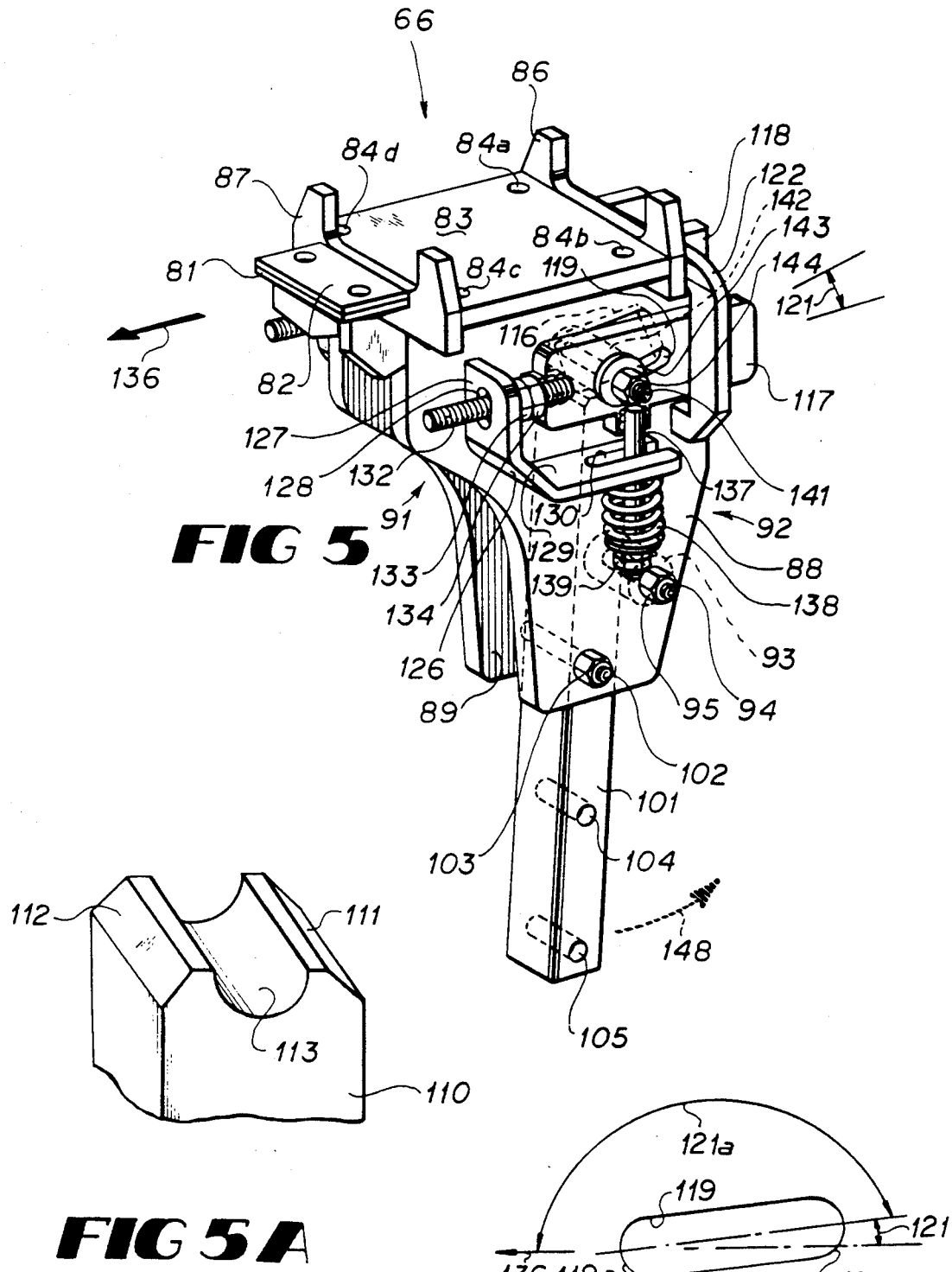

REVERSIBLE PLOW WITH SPRING-BIASED TRIP SHANKS

TECHNICAL FIELD

This invention relates to plows and is more particularly concerned with a reversible plow which can selectively throw the dirt in one direction or the other, as desired.

BACKGROUND OF THE INVENTION

In the past, reversible plows have been developed which will selectively direct the plowed ground in one direction or the other. For example, U.S. Pat. No. 4,800,963 issued Jan. 31, 1989 to Pompeyo B. Gomez discloses a reversible plow in which a tool bar carries a plurality of moldboards which are mounted in alignment with each other at evenly spaced locations along the length of the tool bar, with two moldboards being forward of a central pivot pin and two moldboards being rearward of the central pivot pin. A main frame carries the moldboard frame while a reversing arm, which cooperates with the moldboard frame and is operated hydraulically, pivots the moldboard frame from one angular position to the other with respect to the frame.

Such reversible plows typically have the moldboards pivotally mounted to support shanks which in turn depend from and are rigidly secured to the tool bar. The moldboards are secured against rotation by a shear pin or shear bolt fastening the moldboard to its respective support shank. With this construction, in the event the moldboard strikes a heavy object while plowing, the resulting forces act to shear off the shear pin and large-scale damage to the plow should be avoided. Unfortunately, replacing sheared off shear bolts in the field can be troublesome and too often some damage is done to the moldboard or to its support shank.

U.S. Pat. No. 3,910,354 of Johnson et al. discloses a toggle trip for a moldboard plow in which a normally over-center toggle mechanism can be tripped by forces resulting from the moldboard striking an unyielding object in the soil. In such an instance, a heavy leaf spring is straightened out, thereby pulling the toggle mechanism from its over-center position toward an under-center position to allow the toggle mechanism and the moldboard to be swung up and out of the way of the unyielding object. The structure disclosed in the patent is generally complex, much of which structure is positioned above the tool bar, thereby posing a potential clearance problem with other equipment to be mounted to the tool bar, such as a gauge wheel mounting arm.

SUMMARY OF THE INVENTION

Briefly described, the present invention comprises a plow including a main frame having a three point hitch for a tractor by which the plow may be towed or lifted, as desired. The main frame carries a tool bar which is pivotally mounted at a rear central portion of the main frame, the tool bar being provided with a plurality of moldboards which are pivotally mounted to the tool bar by spring-biased trip shank assemblies which are repositionable along the length of the tool bar.

The tool bar of the present invention can be shifted from left of center to right of center by a hydraulic piston and cylinder. The spring-biased trip or shank assemblies are removably clamped to the tool bar and each carries a pivotally adjustable bidirectional moldboard having two points and an arcuate surface. Each moldboard is transversely disposed below the tool bar and protrudes by an equal amount from each side of the tool bar.

The spring-biased trip assemblies each include a support frame for mounting to the underside of the tool bar and a shank is pivotally mounted to the support frame. Means are provided for releasably securing the shank in a generally upright position at an angle relative to the tool bar. The releasable securing means includes a securing pin extending through an opening formed in the support frame and adapted to engage an upper end of the shank when the shank is in its generally upright position. The releasable securing means also includes a plate movably mounted adjacent the support frame and having an elongate slot formed therein for receiving the securing pin therein. The elongate slot is oriented at an angle with respect to the tool bar in a manner to allow the securing pin to be moved laterally within the elongate slot when the shank is rotated in a first direction. The angled elongate slot also causes the plate to be urged generally upwardly when the shank is rotated in a second, opposite direction. A spring is provided for resisting the generally upward movement of the plate. Preferably, means are provided for adjusting the angle of the shank relative to the tool bar in its relatively upright position to vary the angle of the moldboard.

With this construction, as the plow advances through the soil and one of the moldboards strikes an unyielding object, the force acting on the moldboard by the unyielding object causes the shank to rotate, thereby moving the upper end of the shank in the second direction. The upper end of the shank thereby urges the securing pin generally upwardly and generally transverse to the elongation of the elongate slot. This causes the plate to be forced generally upwardly, against the biasing force of the spring. When this upward force is great enough, the plate is moved upwardly enough to disengage the securing pin from the shank, thereby tripping the shank and allowing the shank to rotate freely to allow the moldboard to pass over the unyielding object.

To reset or cock the spring-biased trip assembly, the shank (and the moldboard) is rotated in the first direction, opposite the second. As the shank approaches a vertical orientation, its upper end engages the securing pin. Further rotation of the shank pushes the securing pin laterally along the elongated slot. Since the elongated slot is oriented at an angle, the securing pin is raised as it moves along the elongated slot in this direction until it is moved sufficiently high enough to allow the shank to pass partially thereunder, whereupon the securing pin falls downwardly into a releasable locking engagement with the upper end of the shank. In this way, the trip assembly can be reset without compressing the biasing spring.

Accordingly, it is an object of the present invention to provide a reversible plow which is inexpensive to manufacture, durable in structure and efficient in operation.

Another object of the present invention is to provide a reversible plow in which the various parts may be readily and easily replaced.

Another object of the present invention is to provide a reversible plow in which the tilt of the moldboard can be adjusted, as desired.

Another object of the present invention is to provide a moldboard assembly wherein the moldboard, when engaging a large rock or other obstacle, does not shear a pin when it tilts rearwardly, so as to reduce or eliminate damage to the moldboard.

Another object of the present invention is to provide a reversible plow with moldboards supported upon spring-biased mountings which, when the mounting assemblies are tripped, can be easily reset in the field without compressing a spring.

Another object of the present invention is to provide a reversible plow in which the moldboards of the plow can be readily and easily adjusted along the length of the tool bar.

Another object of the present invention is to provide a reversible plow in which after one of the moldboards strikes an unyielding object, can be quickly and easily reset.

Another object of the present invention is to provide a reversible plow with tripping mechanisms for mounting moldboard to a frame of the plow, while leaving a region above the frame clear for mounting other equipment thereto.

Another object of the present invention is to provide a reversible plow in which additional moldboards may be readily and easily installed on the plow.

Other objects, features, and advantages of the present invention will become apparent when considered in conjunction with the accompanying drawings.

BRIEF DESCRIPTION OF THE DRAWINGS

FIGS. 2-4 are schematic side views of portions of in-furrow reversible plows according to the present invention showing plows having 3, 4, and 5 spring-biased trip shank assemblies, respectively.

FIGS. 5 and 5A are perspective views of a front trip shank assembly portion of the reversible plow of FIG. 1;

FIG. 5B is a schematic illustration of a portion of the shank assembly of FIG. 5;

DETAILED DESCRIPTION

Figure 1:
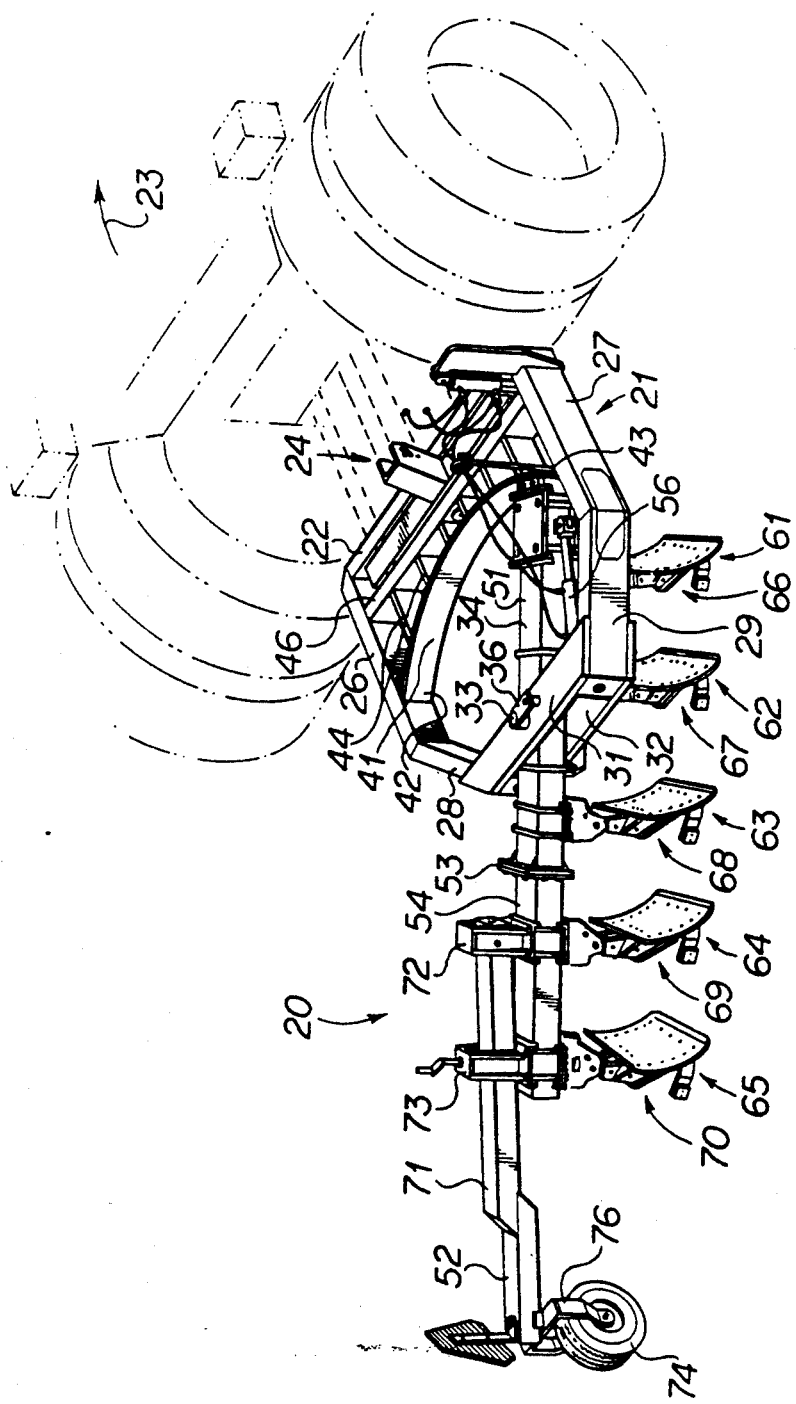
FIG. 1 is perspective view of an in-furrow reversible plow constructed in accordance with the present invention.

Referring now in detail to the embodiments chosen for the purpose of illustrating the present invention, FIG. 1 shows an in-furrow reversible plow 20 according to a preferred form of the present invention. The in-furrow reversible plow 20 includes a trapezoidal, horizontal main frame 21. The main frame 21 includes a front tow bar or crossbar 22 which extends transversely with respect to the path of travel 23 of the plow. In a central portion of the crossbar 22 is a central hitch 24 including a pair of opposed upwardly and forwardly extending central hitch plates each of which is provided with a pair of vertically spaced holes. The pairs of holes are transversely aligned with each other so that a pin (not shown) can pass through either of the holes to connect the plow to the central hitch of a tractor (not shown).

Outwardly of the central hitch 24 on crossbar 22 are opposed pairs of lower or side hitch plates (not shown). Each hitch plate is provided with a hole, the holes being transversely aligned with each other to receive pins (not shown) which secure the side hitch plates to the lower or side hitches of a tractor (not shown) so that the action of the three point hitch can raise and lower the plow, as desired.

The main frame 21 shown in FIG. 1 includes a pair of transversely spaced, opposed, longitudinally extending, parallel, side bars 26,27 which extend rearwardly from the end portions of the crossbar 22. Connected to the rear ends of these side bars 26,27 are a pair of rearwardly converging bars 28,29, the rearmost ends of which are joined by upper and lower transverse plates 31 and 32, these transverse plates being in vertically spaced, opposed parallel relationship to each other. In the central portion of the plates 31 and 32 are vertically aligned holes which receive therethrough a pivot pin 33. The holes are aligned longitudinally with the longitudinal axis of the plow and, therefore, are aligned with the space between the plates of the central hitch 24. Pivot pin 33 passes through a tool bar 34, which tool bar will be described in more detail below. An upper portion of the pivot pin 33 is provided with a mounting plate 36 which bolts to upper transverse plate 31 to secure pivot pin 33 in place.

A guide bar 41, which is rearwardly concave and concentric about the axis of pivot pin 33, has its ends 42,43 secured to the side bars 26,27, respectively. A series of transversely spaced, longitudinally extending ribs 44 extend between an intermediate bar 46 and the convex side of guide bar 41 so as to fix the position of guide bar 41 within and in the plane of the main frame 21.

The pivot pin 33 protrudes through an appropriate hole in the straight, swingable tool bar 34, which is a hollow, rectangular or square member in cross section, the tool bar 34 being sufficiently narrow that it passes between the opposed plates 31 and 32. A forward portion 51 of the tool bar 34 of the plow protrudes forwardly within the frame 21 and terminates with its forward end adjacent to the curved or arcuate guide bar 41. The tool bar 34 is thus free to pivot about the vertical axis of the pivot pin 33 so that the forward end of the tool bar can swing from one end portion 42 of the guide bar 41 to the other end portion 43 of the guide bar. The swing to the left from the longitudinal axis of the plow is between about 38° and about 40° and the swing to the right from the longitudinal axis of the plow is also about 38° to about 40°. The forward portion 51 of the length of the tool bar 34 is between the pivot pin 33 and the guide bar 41, and a rearward portion 52 extends rearwardly of pin 33.

The rear portion of the tool bar 34 protrudes rearwardly from the frame 21 and is provided at its rear end with an upstanding butt plate 53 which is perpendicular to the axis of bar 34 and against which a tool bar extension 54 is removably affixed.

For hydraulically shifting the tool bar 34 from its extreme left position to its extreme right position and vice versa, a double acting hydraulic cylinder 56 is pivotally connected by its rear end portion to the rearmost inner surface of one of the converging bars 28,29. The piston rod of this double acting cylinder 56 is pivotally connected by its forward end portion to a sidewise extending bracket on the side of the forward portion of the tool bar 34. The arrangement of the cylinder 56 is such that, when the piston is retracted, the forward portion 51 of the tool bar 34 is swung to its rightmost position and when the piston rod is extended, the forward portion 51 of the tool bar 34 will be swung to its leftmost position.

A series of evenly spaced moldboards 61-65 are mounted beneath the tool bar 34 and the tool bar extension 54 by spring-biased trip shank assemblies 66-70. A gauge wheel support arm 71 is pivotally mounted at its forward end to a gauge wheel mounting bracket 72 commonly mounted to the tool bar extension 54 with spring-biased trip assembly 69. A gauge wheel height adjustment mechanism 73 is mounted at a rearward end of extension 54 and is commonly mounted with spring-biased trip shank assembly 70. A gauge wheel 74 is rotatably mounted to a wheel yoke 76 which in turn is pivotally mounted to a rearward portion of gauge wheel support arm 71.

As shown in FIGS. 2-4, the number of spring biased trip shank assemblies provided on the plow can be varied as desired. FIG. 2 shows a portion of an in-furrow reversible plow having five spring trip assemblies for supporting five moldboards, including a forward or first spring trip assembly 66, a second spring trip assembly 67 and other spring trip assemblies 68-70. Each spring trip assembly has identical or nearly identical construction which will be discussed in more detail below. However, in the mounting of the spring trip assemblies to the tool bar 34, some slight variations in the individual spring trip assemblies might be necessary to provide clearance or to solve other mounting difficulties. For example, front spring trip assembly 66 includes a wear pad mounting bracket 81 for supporting a wear pad 82 for movably mounting the tool bar 34 to the guide bar 41. (A corresponding upper wear pad 82a is supported by upper mounting bracket 81a.) Also, second trip shank assembly 67 has an elongated upper portion to allow the trip shank assembly to be mounted to the tool bar 34 while spanning the pivot action of pin 33 pivoting about pivot axis 35. Also, some of the elements of each spring trip assembly may need to be turned to the left or to the right, as shown in FIGS. 2-4, in order to provide clearance for the moldboards or other components.

FIG. 5 shows the front or forward trip shank assembly 66 including an upper mounting plate or bracket 83 for securing the trip shank assembly to an underside portion of the tool bar 34. The bracket 83 is generally plate-shaped and includes four bolt holes 84a-84d for receiving bolts for securing the spring trip assembly to the underside of the tool bar. U-shaped end flanges 86 and 87 are rigidly secured to the plate 83, with the upstanding portions of the U-shaped flanges adapted to straddle a lower portion of the tool bar.

The forward trip shank assembly also includes two sturdy side plates 88 and 89 welded to the underside of upper plate 83 in parallel spaced apart relationship. A leading edge 91 of the side plates has a generally curved contour, while a trailing edge 92 has an angled contour. In a lower portion of the side plates, the side plates are held apart at a fixed distance from one another by a spacer 93 positioned between the side plates 88 and 89. A bolt 94 extends through both side plates and through the spacer 93 and is secured in place by a nut 95.

An elongate shank 101 is rotatably mounted between the side plates about bolt 102 which is secured by nut 103. A lower portion of the shank 101 has formed therethrough bolt holes 104 and 105 for mounting a moldboard to the shank. As shown in FIG. 5A, an upper portion 110 of shank 101 includes chamfered edges 111 and 112 and a central, half cylindrical trough 113 having a 0.75 inch radius.

Each of the side plates 88 and 89 includes a rhombus-shaped opening having rounded corners, such as opening 116 in side plate 88. A pivot pin plate 117 of generally rectangular construction is movably positioned flushly against the outside surface of side plate 88. Another pivot pin plate 118 is positioned against the outside surface of side plate 89. The pivot plates 117 and 118 are identical to one another and each includes an elongated slot, such as slot 119 in pivot pin plate 117, formed therein and extending at an angle 121, preferably 10°, with respect to the axis of elongation of the rectangular pivot pin plate 117. With the pivot pin plate in a horizontal attitude, the slot is oriented at 170° relative to the direction of travel 136 (see angle 121a of FIG. 5B). Thus, the included angle between forward direction 136 and an axis extending from foward end 119a of slot 119 through trailing end 119b of slot 119 is 170°. In an actual commercial embodiment, the elongate slot 119 is 2-⅜" long, 1" tall with rounded ends having a radius of ½". Also in this commercial embodiment, the rhombus shaped slot formed in the side plates is 2-½" long and 1-¾" high.

A generally C-shaped retaining bracket 122 is welded to each of the side plates 88 and 89 for movably retaining the pivot pin plates there against. In the transverse direction, the C-shaped brackets hold the pivot pin plates against the side plates with suitable running clearance, while in the vertical direction, the C-shaped brackets allow substantial clearance to allow the pivot pin plates to move up and down within the C-shaped brackets. Preferably, ⅛" or so of total clearance is provided between the pivot pin plate and the C-shaped bracket in the vertical direction.

A clevis 126 is welded to each of the side plates and each clevis includes a vertical flange 127 having an opening 128 formed therein and a horizontal flange 129 having an opening 130 formed therein. Opening 128 is elongated in the vertical direction and receives therethrough a threaded shaft 132 which is welded at one end thereof to an end of pivot pin plate 117. A pair of locking nuts 133 and 134 are threaded on the horizontal threaded shaft for limiting the lateral movement of the pivot pin plate in the forward direction 136.

A vertical shaft 137 is welded to a tang formed in a lower portion of the pivot plate 117 and extends downwardly through the opening 130 in the horizontal flange 129. A compression spring 138 is mounted about the vertical shaft 137 and is secured thereon by end fastener 139. The function of the compression spring 138 is to resist upward movement of the pivot pin plate 117.

A pivot pin 141 extends completely through the pivot plates 117 and 118 and through the side plates 88 and 89. Positioned about the pivot pin 141 and extending between the side plates 88 and 89 is a large bushing or roller 142. A pair of small rollers 145 or bushings are positioned on the pivot pin 141 (see FIG. 11), the pair of small bushings being positioned on opposite ends of the large bushing 142. As best seen in FIGS. 11 and 12A-12C, the small bushings are sized to fit well within the large rhombus-shaped openings formed in the side plates 88 and 89. Referring again to FIG. 5, washers 143 and self-locking nuts 144 are mounted to the pivot pin 141 for retaining it in place. In the commercial embodiment referred to earlier, the pivot pin is ⅞" in diameter and 8.5" long, while the large bushing has a 1-½" outside diameter and is 2.125" long. The small bushings are 1-3/16" long with a 1.125" outside diameter.

Figure 6:
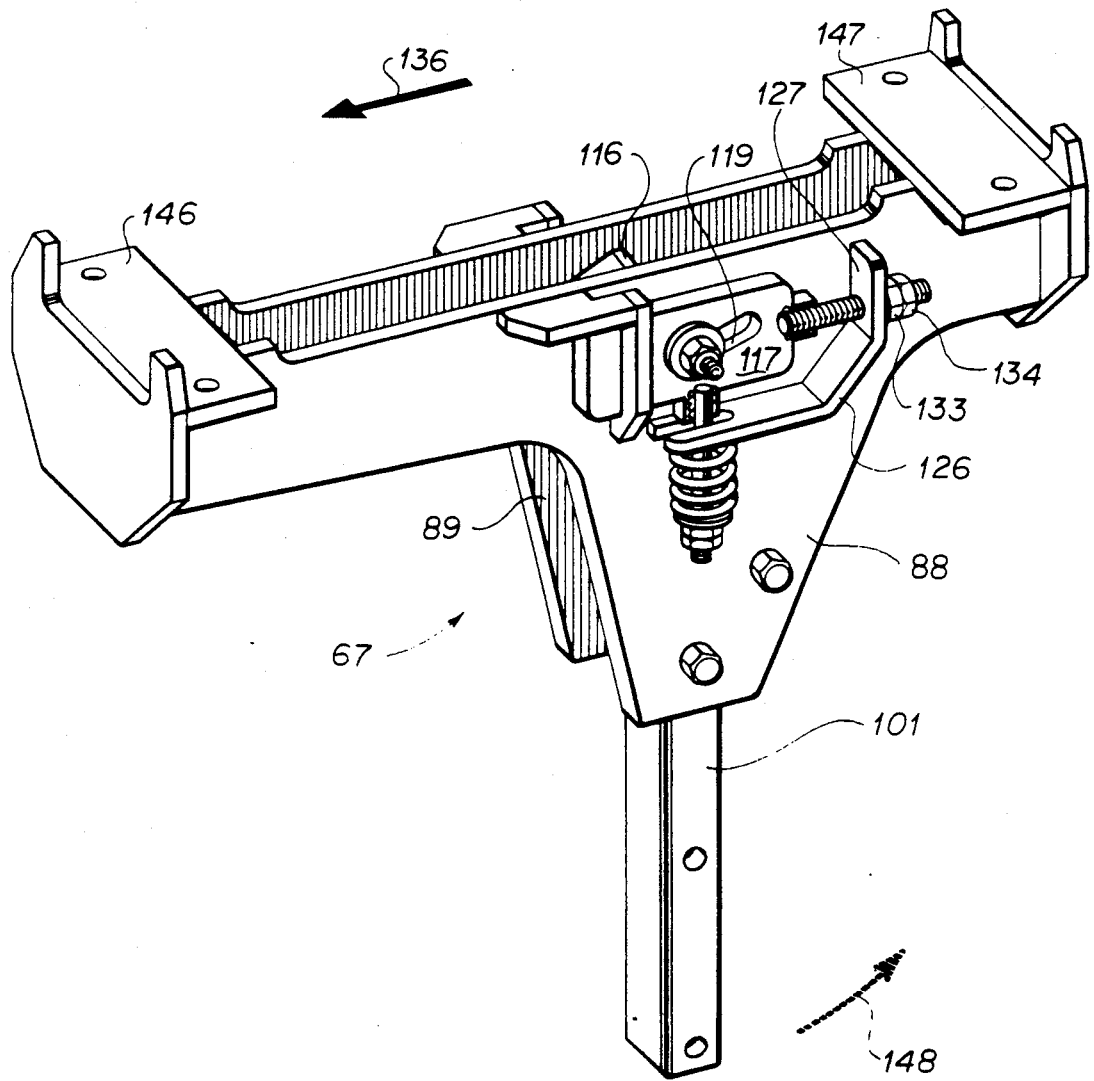
FIG. 6 is a perspective view of a second trip shank assembly portion of the reversible plow of FIG. 1.

FIG. 6 shows the second spring-biased trip assembly 67 which is specially adapted to be mounted beneath the pivot pin 33 positioned in the tool bar 34, without interfering with the pivoting motion of the tool bar with respect to the main frame 21. Accordingly, the upper portion of the side plates 88 and 89 are elongated to a significant degree to allow the assembly to straddle the pivoting junction between the tool bar and the main frame. Thus, the upper plate 83 of the forward assembly 66 is replaced with two smaller plates 146 and 147 for mounting the second spring strip assembly 67 to the underside of the tool bar. Also, the clevis 126 shown on the forward spring trip assembly 66 is turned around in the other direction on the second spring trip assembly 67 for the purpose of providing additional clearance. Also, the pivot plate 117 is turned in the opposite direction, although the elongated slot 119 formed therein is maintained at the same 10° angle with respect to the elongation of the pivot pin plate 117 and at the same orientation with respect to the direction of travel 136. Another difference between the arrangement of the forward spring trip assembly and that of the second spring trip assembly is that the lock nuts or jam nuts 133 and 134 are positioned on the outside of the vertical flange 127 of the clevis 126 so as to continue to limit the lateral movement of the pivot plate 117 in the forward direction 136 in an adjustable manner. Of course, the forward spring trip assembly shown in FIG. 5 and the second spring trip assembly shown in FIG. 6 each depict the generally upright orientation of the shank 101, and as the plow is moved in a forward direction 136 and the unshown moldboard strikes an unyielding object, the shank 101 tends to rotate about pin 102 in the direction of direction arrow 148.

Figure 7:
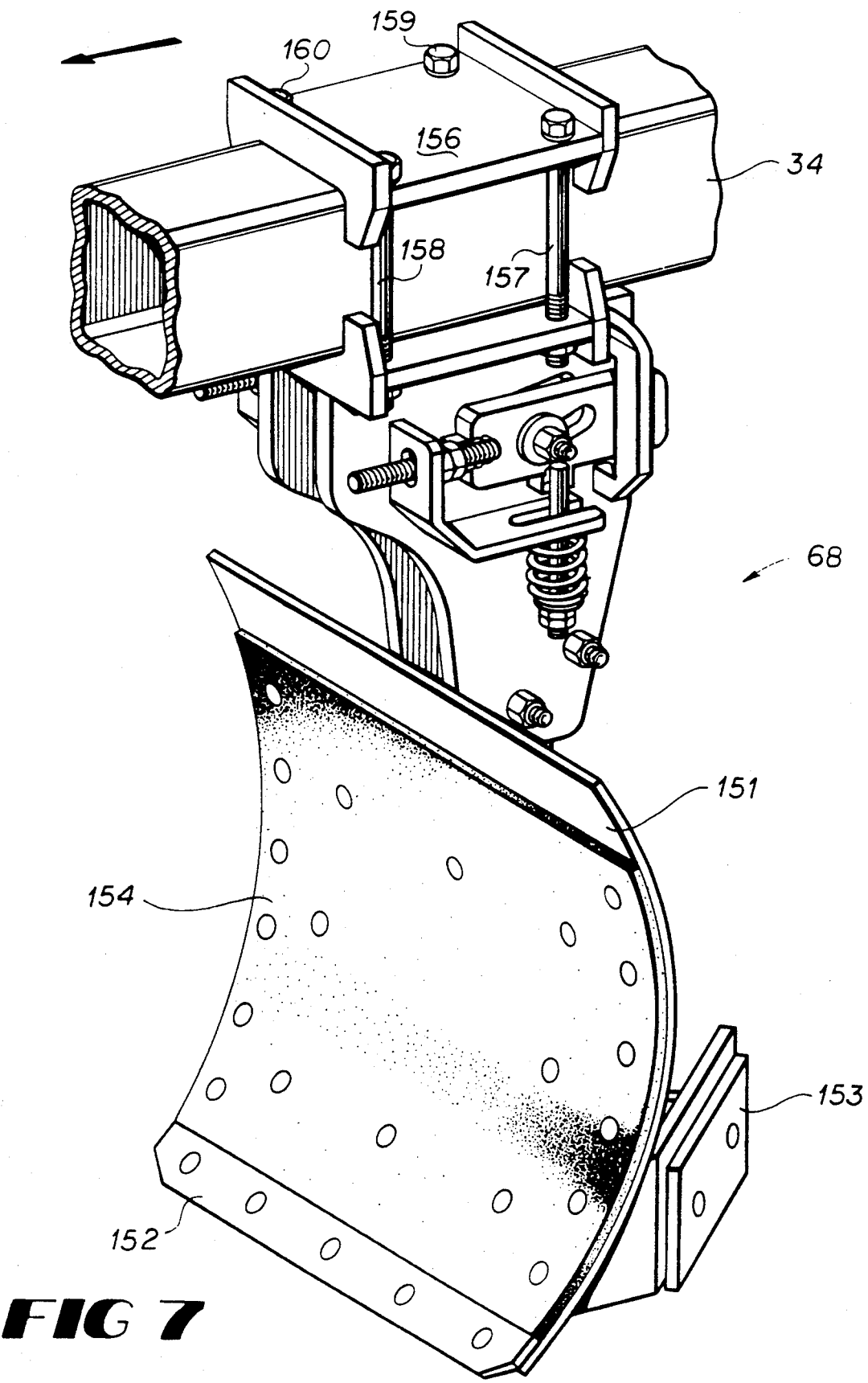
FIG. 7 is a perspective view of another trip shank assembly portion of the reversible plow of FIG. 1 shown supporting a moldboard.
Figure 8:
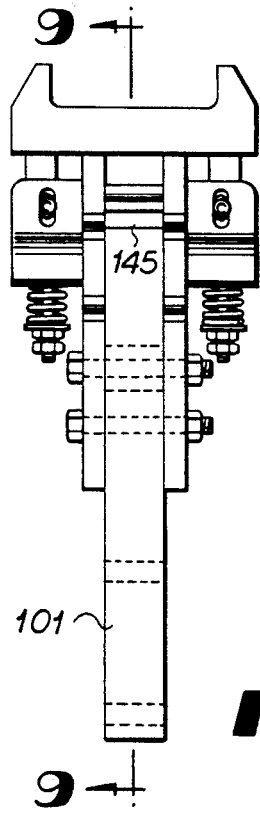
FIG. 8 is a front elevation view of the trip shank assembly portion of FIG. 7.

FIG. 7 shows another spring trip assembly 68 mounted to the tool bar 34 and carrying thereon a moldboard 151. This assembly typically is used on third and ensuring positions. The moldboard includes a plow point 152, a first slide 153 and a second unshown slide on the opposite side of the moldboard. The moldboard also includes a steel or plastic wing 154. The details of the construction of the moldboard are well known in the art and further discussion is not needed here. FIG. 7 also shows an upper mounting bracket or mounting plate 156 for securing the trip assembly 68 to an underside portion of the tool bar 34 using bolts, such as bolts 157, 158, 159 and 160. In the alternative, U-shaped bolts can be looped over the tool bar 34 and the upper bracket 156 can be done away with.

The tool bar 34 usually carries several moldboard assemblies. The tool bar 34 can be of any reasonable length as a unitary bar or formed with an extension, such as extension 54. Usually, an in-furrow plow as shown in FIGS. 1-12 will have fewer moldboard assemblies forward of the pivot pin 33 than rearwardly thereof, and on-land plows typically have a greater number of moldboard assemblies forward of pivot pin 33 than rearwardly thereof.

Figure 13:
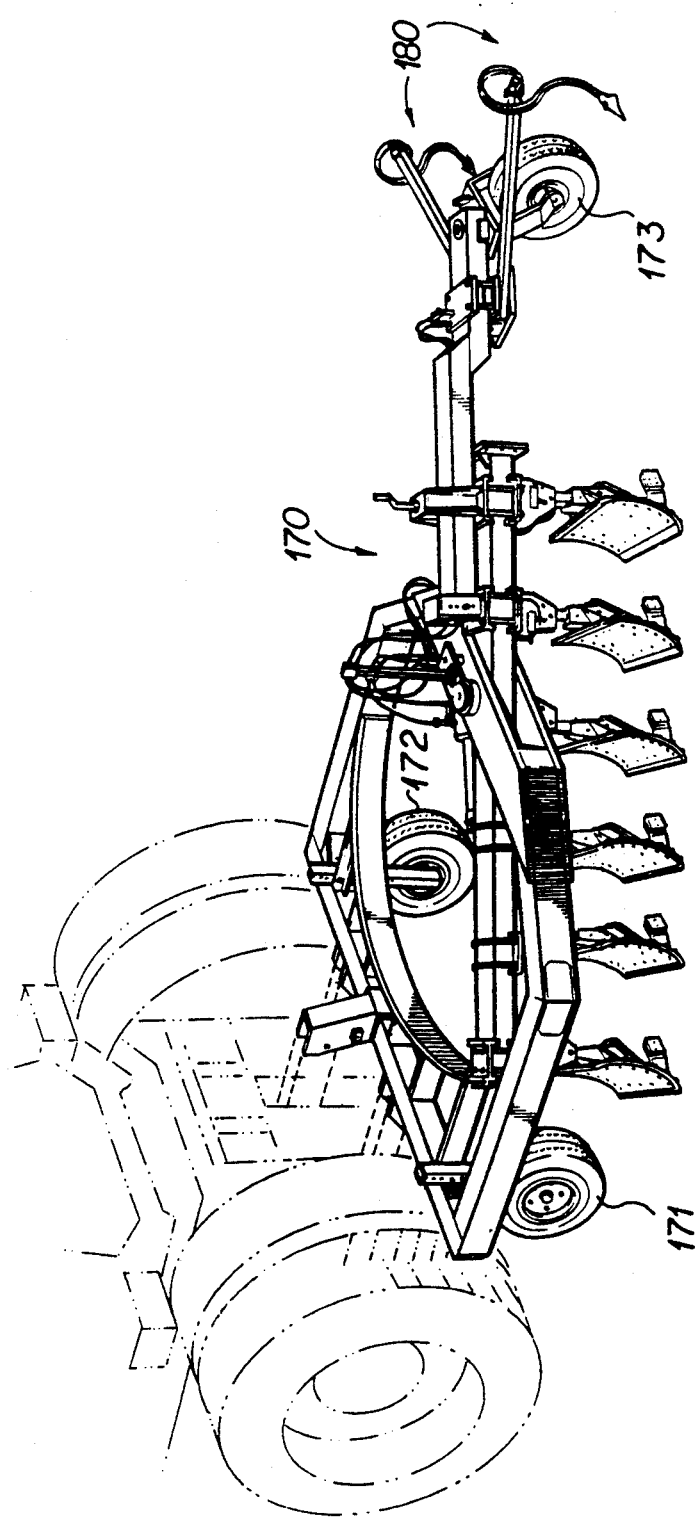
FIG. 13 is a perspective view of an on-land reversible plow according to the present invention.

FIG. 13 shows a modified preferred form of the invention in which an on-land plow 170 is provided with a pair of forward wheels 171 and 172 and a rear wheel 173. The main frame of the on-land plow differs from the main frame of the in-furrow plow in that the on-land plow does not include the tiltable mechanism at the forward end thereof. In this respect, the on-land plow is simpler in construction. Otherwise, the on-land plow is fairly similar to the in-furrow plow, particularly in respect to the spring-biased trip assemblies. In the particular embodiment shown in FIG. 13, six (6) spring-biased trip assemblies are shown.

For the on-land plow of FIG. 13 there is removably mounted on the guage wheel support arm 71 a row marker 180 to mark a line along the ground so as to assist the tractor operator in maintaining a uniform distance from the previously plowed furrow. This row marker 180 is described in detail in U.S. Pat. No. 5,000,267 and further description is unnecessary.

From the foregoing description, the operation of the present plow should be apparent. The plow 20 is attached by its three hitches to the three hitches of a conventional tractor. By manipulating the top hitch of the tractor, the plow can be tilted so as to lift the rear wheel(s) of the plow off the ground and also to lift all of the moldboards off of the ground. The tractor can then be driven to any designated location to begin plowing. It is preferable to operate the hydraulic system so as to move the tool bar 34 to the left or the right, prior to the time that the plow is lowered onto the ground. When the tool bar has been positioned, as desired, the plow is lowered so that the wheel(s) rest upon the ground. Then the tractor is operated so as to begin plowing. Each time the plow reaches the end of a furrow, the plow should be lifted off the ground as the tractor is turned to begin a subsequent operation. Furthermore, the tool bar 34 also should be shifted from one angular position to the other. This shifting, of course, is accomplished by the control on the tractor (not shown) which manipulates the hydraulic system.

The moldboards are always generally transverse to the tool bar 34 and when the tool bar 34 is shifted to the right, the left corner of each moldboard acts as the plow point and vice-versa.

As pointed out previously, an extension can be added to the tool bar 34, if desired. The wheels of the on-land plow can be adjusted vertically and the position of the rear wheel of the in-furrow plow and the on-land plow can be adjusted by the crank so as to regulate the depth to which the moldboards penetrate.

The in-furrow plow has no front wheels and the plow is supported in the front, solely by the three hitches of the tractor which are connected to the two bar via the center hitch plates and the side hitch plates. Thus, the tow bar always remains parallel to the rear axle of the tractor and the main frame of the plow 20 pivots about a central longitudinal axis defined by an unshown shaft. The only wheel on the in-furrow plow is the rear wheel. The piston causes the plow to remain horizontal as one wheel of the tractor is in the furrow by tilting the frame of plow to the left or right, as is appropriate. Thus, the piston rod is fully retracted for a tilt to one side and fully extended for a tilt to the other side. The amount of tilt depends on the length of stroke of the piston rod. This stroke is not adjustable. The degree of tilt of the frame of plow is the same to the left or to the right so that the lower forward corner of each moldboard should penetrate to the same depth regardless of which corner is forward and regardless of the direction of plowing.

Figure 9:
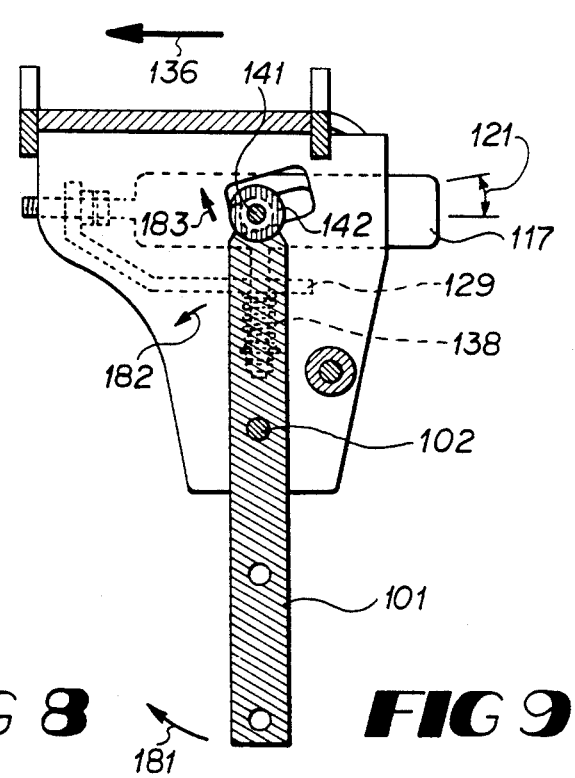
FIG. 9 is side view of the trip shank assembly portion of FIG. 8 taken along the line 9—9.
Figure 10:
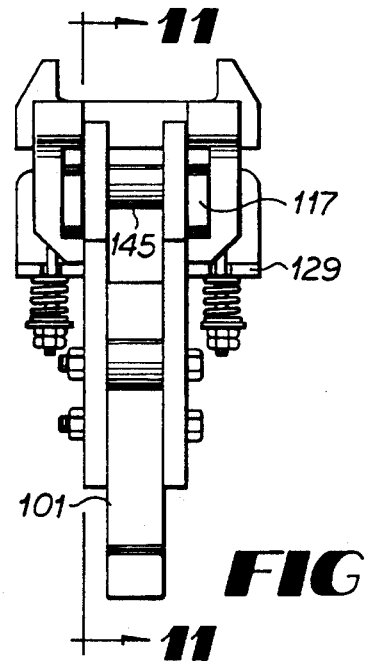
FIG. 10 is a rear elevation view of the trip shank assembly portion of FIG. 8.
Figure 11:
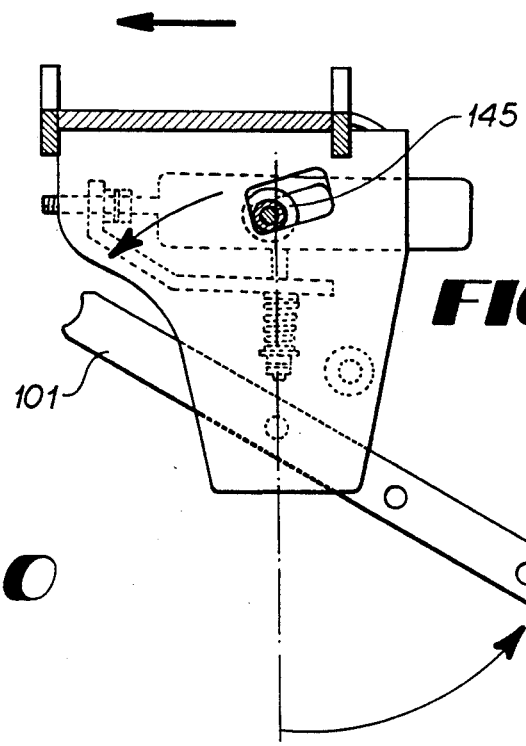
FIG. 11 is a side view of the intermediate trip shank assembly portion of FIG. 10 taken along the line 11—11.
Figure 12:
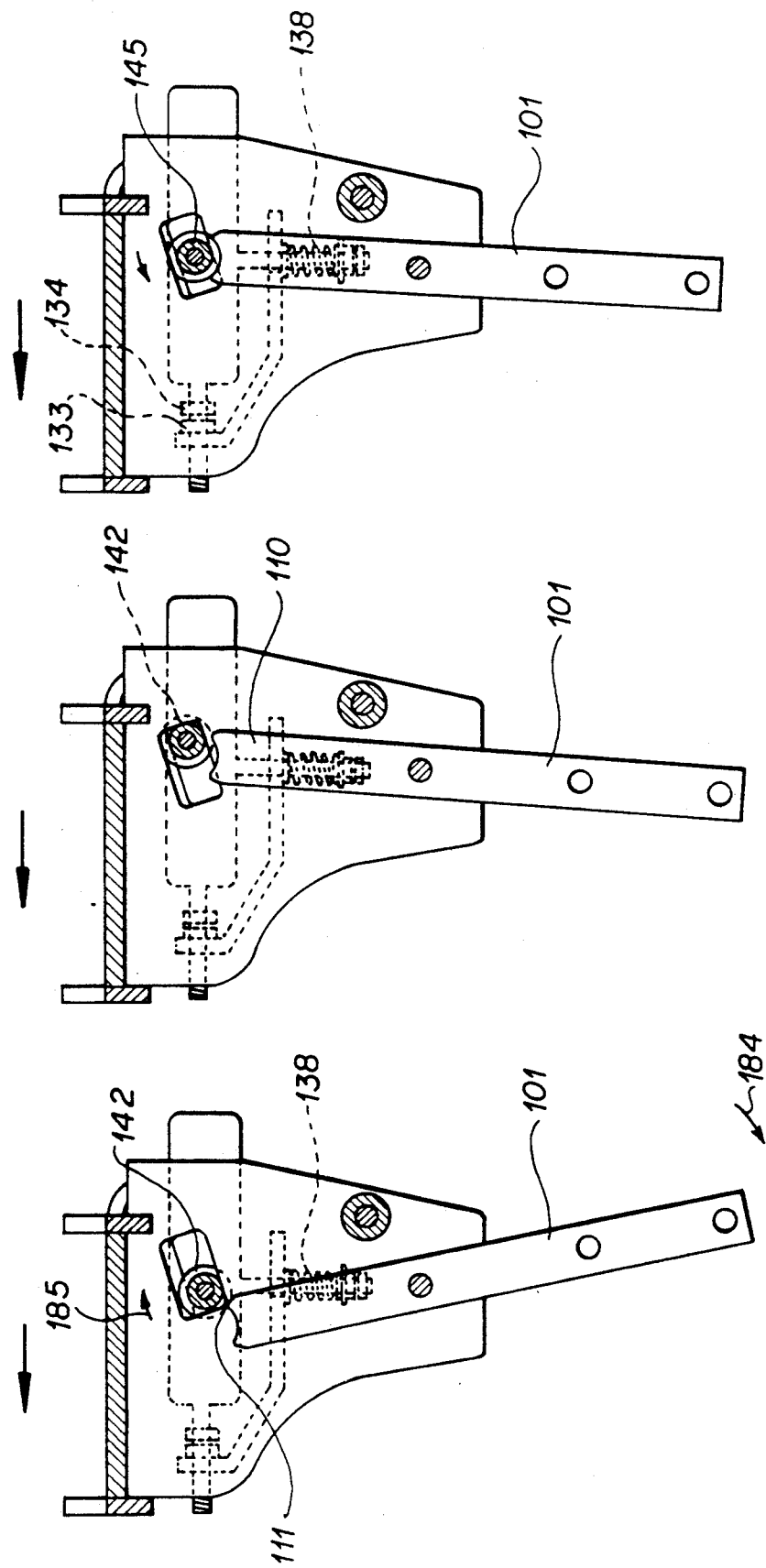
FIGS. 12A-12C are schematic views of the trip shank assembly portion of FIG. 7 depicting the resetting of the trip shank.

FIGS. 9 and 11 show the action of the various elements when the spring trip shank assemblies are tripped, as by an unyielding object engaged in the soil by the moldboard. Referring now to FIG. 9, as the moldboard moves through the soil in the direction of direction arrow 136 and strikes an unyielding object in the soil, a large force is exerted on the moldboard in an opposite direction to direction arrow 136 and this large force is transferred from the moldboard to the shank 101. This large force is depicted by force arrow 181. This force 181 acting on the shank 101 causes the shank to tend to rotate about its center pivot pin 102 in the direction of direction arrow 182.

As the shank 101 begins to rotate in the direction of direction arrow 182, the large bushing 142 is urged upwardly and slightly to the left as depicted by direction arrow 183. This can be understood by noting that the large bushing 142 rests in the half cylindrical trough 113 of the upper portion 110 of the shank 101. Together, the outer surface of the large bushing 142 and the half-cylindrical trough 113 of the shank provide a camming action thereby forcing the large bushing upwardly and slightly to the left. Of course, the large bushing is carried about the pivot pin 141 which extends completely through both side plates and through both pivot pin plates. Thus, the pivot pin 141 also is urged upwardly and to the left.

The pivot pin 141 is slidably received within the elongated slots formed in the pivot pin plates. However, the angle 121 at which the elongated slots are oriented relative to the elongation of the pivot pin plates is generally perpendicular or transverse to the direction 183 in which the pivot pin is now being urged. Thus, the pivot pin is constrained from moving relative to the elongated slot in this situation, but rather the pivot pin thereby carries the pivot pin plates 117 upwardly and to the left in the direction of 183. This upward and slightly to the left movement of the pivot pin plates is resisted by the stiff springs 138 acting against the horizontal flanges 129. Only when the force exerted by the unyielding object is sufficiently large to overcome the spring force exerted by the spring 138 to an extent enough to allow the shank 101 to pass under and by the large pin 142 is the assembly tripped. When that happens, the shank 101 is then completely unrestrained in its movement and freely rotates in the counterclockwise direction as shown in FIG. 11. Spacer 93 acts as a stop to prevent the shank 101 from rotating so much that the moldboard would strike the tool bar. In considering this tripping action, it is important to bear in mind that the large pin 142 is positioned between the side plates 88 and 89 and it does not extend into either of the large rhombus-shaped slots formed in the side plates. Rather, the small bushings on each side of the large bushing are positioned within these rhombus-shaped openings, while the pivot pin 141 extends through the smaller, elongated slots.

FIGS. 12A–12C show how the spring-biased trip assemblies are reset. As shown in FIG. 12A, to begin to reset a spring-biased trip assembly, a moldboard (unshown) is urged or pushed in a clockwise direction as depicted by direction arrow 184. This causes the upper end of the shank 101 to move to the right as depicted by direction arrow 185. As the shank 101 approaches a generally upright or vertical orientation as depicted in FIG. 12A, its chamfered edge 111 (see also FIG. 5A) contacts a lower portion of the large bushing 142 and begins to urge the large bushing upwardly and to the right as depicted by direction 185. Because the large bushing and the pin carried therein are urged in the same general direction as the small, elongated slot formed in each of the pivot pin plates, the pivot pins are allowed to slide upwardly and to the right in the direction of direction arrow 185 within the slots without overcoming or compressing the compression springs 138. Eventually, the large bushing 142 and the pin carried therein are moved far enough to the right and carried high enough within the elongated small slots in the pivot pin plates that the upper portion 110 of the shank 101 can pass under the large bushing 142, as depicted in FIG. 12B. At this point, the large bushing 142 is free to roll or drop downwardly into the elongated trough 113, thereby releasably securing the shank in a generally upright position. This is shown in FIG. 12C. Thus, the trip shank assembly can be reset without compressing the compression spring 138. This has the advantage of providing additional safety and is easier to operate in the field.

The orientation of the shank 101, and thereby the orientation of the moldboard, can be adjusted by manipulation of the jam nuts 133 and 134. These jam nuts limit the movement of the pivot pin plates in one lateral direction. For example, in FIG. 12C, the jam nuts 133 and 134 limit the leftmost movement of the pivot pin plate. Since as the plow is pulled along the ground, the forces acting on the moldboard tend to push the top of the shank in the same general direction as the direction of travel, limiting the forwardmost movement of the pivot pin plate adjusts the angle of the moldboards in the ground as the plow is pulled along.

It will be obvious to those skilled in the art that many variations may be made in the embodiments here chosen for the purpose of illustrating the present invention, without departing from the spirit and scope of the invention as defined by the appended claims.

We claim:

1. A reversible plow for use with a farm tractor comprising:

a main frame for coupling to the tractor;
an elongated tool bar pivotally mounted to said main frame;
means for pivoting said tool bar relative to said main frame;
a plurality of moldboards; and
a plurality of spring-biased trip assemblies mounted to said tool bar for mounting said moldboards to said tool bar, said trip assemblies each comprising,
side plates each having an opening formed therein,
a pivot pin plate movably mounted adjacent each of said side plates and having formed therein an elongate slot oriented at an angle relative to said tool bar,
a pivot pin extending through said openings and through said elongate slot,
an elongate shank pivotally mounted to said side plate and having a recess formed in an upper portion thereof for releasably receiving said pivot pin,
biasing means for resisting upward motion of said pivot pin plate, and
said openings, said elongate slots, said pivot pin and said shank being adapted for allowing said pivot pin to move laterally within said elongate slots when said shank is rotated in one direction and for causing said pivot pin plate to be moved against the resistance of said biasing means when said shank is rotated in an opposite direction.

2. A plow as claimed in claim 1 wherein said elongate slots are oriented at an angle of approximately 10° relative to said tool bar.

3. A plow as cliamed in claim 1 wherein said plow is adapted for movement in a foward direction and wherein said slots are oriented at an angle of approximately 170° relative to said forward direction.

4. A plow as claimed in claim 1 wherein said shank is movably positioned intermediate said side plates.

5. A mounting assembly for mounting a moldboard to a moldboard plow frame comprising:
- a support frame for mounting to the moldboard plow frame;
- a shank pivotally mounted to said support frame for supporting the moldboard; and
- a means for releasably securing said shank in a generally upright position relative to the moldboard plow frame, said means for releasably securing comprising a securing member extending through an opening formed in said support frame and adapted to engage an end portion of said shank with said shank in said generally upright position, said means for releasably securing further comprising a constraining member movably mounted to said support frame and having an elongate slot formed therein for receiving said securing member therein, said elongate slot oriented at an angle relative to said moldboard plow frame in a manner to allow said securing member to be moved laterally within said elongate slot when said shank is rotated in one direction and to cause said constraining member to be urged generally upwardly when said shank is rotated in another direction, opposite said one direction, the means for releasably securing further comprising biasing means for resisting the generally upward movement of said constraining member.

6. A mounting assembly as claimed in claim 5 wherein an upper portion of said shank includes a part-cylindrical recess for receiving said securing member, said securing member comprising an elongated, generally cylindrical element.

7. A mounting apparatus as claimed in claim 5 wherein said constraining member comprises a pivot pin plate, said elongate slot being inclined upwardly relative to a forward direction of travel from a leading end of said elongate slot to a trailing end of said elongate slot.

8. A mounting assembly as claimed in claim 5 wherein said support frame includes first and second side plates in parallel, spaced apart relationship to one another, said securing member comprises a pin extending through said side plates and through said elongate slot, said biasing means comprising a spring.

9. A mounting assembly as claimed in claim 5 further comprising means for adjusting the orientation of said shank in its generally upright position.

* * * * *